US012654804B2

(12) United States Patent
Hector, Sr. et al.

(10) Patent No.: US 12,654,804 B2
(45) Date of Patent: Jun. 16, 2026

(54) ROTARY FORCE TRANSFER MECHANISM

(71) Applicant: The Francis Norbert Hector Sr. & Bertha F. Hector Irrevocable Trust, Browns Summit, NC (US)

(72) Inventors: Francis Norbert Hector, Sr., Browns Summit, NC (US); Michael Sean June, Rossville, TN (US)

(73) Assignee: The Francis Norbert Hector Sr. & Bertha F. Hector Irrevocable Trust, Browns Summit, NC (US)

( * ) Notice: Subject to any disclaimer, the term of this patent is extended or adjusted under 35 U.S.C. 154(b) by 598 days.

(21) Appl. No.: 18/166,080

(22) Filed: Feb. 8, 2023

(65) Prior Publication Data

US 2023/0271673 A1     Aug. 31, 2023

Related U.S. Application Data

(60) Provisional application No. 63/307,880, filed on Feb. 8, 2022.

(51) Int. Cl.
B62M 1/26 (2013.01)
B62M 1/12 (2006.01)

(52) U.S. Cl.
CPC ................ B62M 1/26 (2013.01); B62M 1/12 (2013.01)

(58) Field of Classification Search
CPC ............ B62M 1/26; B62M 1/12; B62M 1/30
See application file for complete search history.

(56) References Cited

U.S. PATENT DOCUMENTS

| | | | | |
|---|---|---|---|---|
| 6,412,802 B1* | 7/2002 | Kugel | ..................... | B62M 1/30 74/32 |
| 6,723,029 B2* | 4/2004 | Salgado | ................... | B62M 1/30 280/258 |
| 7,891,686 B1* | 2/2011 | Crawford | ............... | B62K 3/005 280/282 |
| 10,569,129 B2* | 2/2020 | Felker | ................ | A63B 22/0605 |
| 11,161,566 B1* | 11/2021 | Fitzgibbons | ............... | B62J 1/02 |
| 2003/0193160 A1* | 10/2003 | Mehmet | ................... | B62M 1/30 280/255 |
| 2011/0275484 A1* | 11/2011 | Beard | .................. | A63B 21/157 482/51 |
| 2018/0066741 A1* | 3/2018 | Luo | ........................... | F03G 5/06 |

* cited by examiner

*Primary Examiner* — Valentin Neacsu
*Assistant Examiner* — Marlon A Arce
(74) *Attorney, Agent, or Firm* — KDW Firm PLLC

(57) ABSTRACT

A rotary force transfer mechanism includes an input (e.g., a pedal or handle) that receives a substantially linear input force (e.g., from a human operator), a rotary structure (e.g., a gear), and a drive element for selective coupling with the rotary structure to transmit the input force to the rotary structure to cause a corresponding rotary motion of the rotary structure. When transmitting the input force to the rotary structure, the drive element engages with an outer circumferential surface of the rotary structure such that the input force is transmitted to the rotary structure in a direction tangential to a position where the drive element is coupled to the rotary structure.

21 Claims, 12 Drawing Sheets

ROTARY FORCE TRANSFER MECHANISM

CROSS-REFERENCE TO RELATED APPLICATION

This application claims priority to U.S. Provisional Patent Application Ser. No. 63/307,880, filed on Feb. 8, 2022, the disclosure of which is incorporated herein by reference in its entirety.

BACKGROUND

Human-powered machines (e.g., vehicles, such as bicycles) primarily rely on the concept of converting reciprocating motion at an input to a rotary motion at an output using a crank mechanism. During the conversion of such reciprocating motion into rotary motion using, for example, the pedals on a bicycle, input power from the legs of the user is generally the greatest when the legs are pushing in a direction generally tangential to the outer surface of the input. This only occurs for approximately ¼ of the circular motion; as the pedal rotates over the top of the input gear, the leg is pushing the pedal towards the front (e.g., tangential to the direction of rotation) and vertically downward and, as the pedal rotates under the bottom of the input gear, the leg is primarily pulling the pedal towards the rear (e.g., tangential to the direction of rotation). The lateral motion of pushing the pedal forward and pulling the pedal rearward utilizes weaker leg muscles than pushing straight down. Additionally, it is known that the use of such conventional rotary machines is inhibited greatly, if not precluded entirely, due to physical limitations of users (e.g., due to limited range of motion of, for example, a hip, knee, or other joint).

SUMMARY

According to a first example embodiment, a rotary force transfer mechanism is provided herein, the rotary force transfer mechanism comprising: an input configured to receive a substantially linear input force; a rotary structure; and a drive element for selective coupling with the rotary structure to transmit the input force to the rotary structure to cause a corresponding rotary motion of the rotary structure; wherein the drive element engages, when transmitting the input force to the rotary structure, with an outer circumferential surface of the rotary structure such that the input force is transmitted to the rotary structure in a direction tangential to a position where the drive element is coupled to the rotary structure.

In some embodiments, the rotary force transfer mechanism comprises a guide attached to a rigid frame, the drive element comprising a follower that is engaged within the guide and is configured to move along a path defined by the guide.

In some embodiments of the rotary force transfer mechanism, the path of the guide is continuous and uninterrupted.

In some embodiments of the rotary force transfer mechanism, as the follower moves along the path defined by the guide, the drive element moves between an engagement position, in which the drive element is coupled to the rotary structure, and a disengagement position, in which the drive element is decoupled from the rotary structure, in an alternating manner.

In some embodiments of the rotary force transfer mechanism, the rotary structure comprises a gear with a plurality of gear teeth formed about the outer circumferential surface of the gear; the drive element comprises a rack gear with a plurality of rack gear teeth formed along a length thereof, the plurality of rack gear teeth of the drive element being configured to engage with the plurality of gear teeth of the gear for transmitting the input force to the gear; and the input comprises a pedal or handle.

In some embodiments of the rotary force transfer mechanism, the pedal or handle is attached: at a rear of the pedal or handle, to a static pivot bearing rigidly attached to the frame; and at a front of the pedal or handle, to a mobile pivot bearing that is configured such that the rack gear is pivotable relative to the pedal or handle.

In some embodiments of the rotary force transfer mechanism, the guide comprises a plurality of parts of the path, each part of the path corresponding to a motion of the rack gear relative to the gear.

In some embodiments of the rotary force transfer mechanism, the path defined by the guide comprises first, second, third, and fourth parts; movement of the follower of the rack gear along the first part of the path comprises a downstroke motion of the rack gear, relative to the gear; movement of the follower of the rack gear along the second part of the path comprises a disengagement motion of the rack gear, relative to the gear, in which the rack gear moves radially away from the gear for the rack gear teeth to disengage from the gear teeth; movement of the follower of the rack gear along the third part of the path comprises an upstroke motion of the rack gear, relative to the gear, the rack gear teeth being disengaged from the gear teeth of the gear during an entirety of the upstroke motion, wherein the upstroke motion is in a substantially opposite direction from the downstroke motion; and movement of the follower of the rack gear along the fourth part of the path comprises a reengagement motion of the rack gear, relative to the gear, in which the rack gear moves radially towards the gear for the rack gear teeth to engage with the gear teeth.

In some embodiments of the rotary force transfer mechanism, the follower is configured to move sequentially through the first, second, third, and fourth parts of the path defined by the guide repeatedly.

In some embodiments, the rotary force transfer mechanism comprises a return mechanism configured to cause movement of the follower sequentially along the third and fourth parts of the path defined by the guide automatically when the follower completes movement entirely through the second part of the path.

In some embodiments of the rotary force transfer mechanism, the return mechanism comprises a spring connected between the frame and the rack gear.

In some embodiments of the rotary force transfer mechanism, the rotary structure comprises a gear with a plurality of gear teeth formed about the outer circumferential surface of the gear; the drive element comprises a downstroke rack gear and an upstroke rack gear, wherein the downstroke rack gear comprises a plurality of rack gear teeth formed along a length of the downstroke rack gear; wherein the upstroke rack gear comprises a plurality of rack gear teeth formed along a length of the downstroke rack gear; and wherein the plurality of rack gear teeth of the downstroke and upstroke rack gears are configured to engage with the plurality of gear teeth of the gear; and wherein the input comprises a pedal or handle.

In some embodiments of the rotary force transfer mechanism, the downstroke rack gear and the upstroke rack gear are provided on opposite sides of the gear from each other in a radial direction of the gear, the downstroke rack gear comprising the follower.

In some embodiments of the rotary force transfer mechanism, the input comprises a pedal or handle; at a rear of the pedal or handle, the pedal or handle is attached to a static pivot bearing rigidly attached to the frame; at a front of the pedal or handle, the pedal or handle is attached to a mobile pivot bearing that is configured such that the rack gear is pivotable relative to the pedal or handle; and between the first mobile pivot bearing and the static pivot bearing, the pedal or handle is attached to the upstroke rack gear at a second mobile pivot bearing, such that the upstroke rack gear is pivotable relative to the pedal or handle.

In some embodiments, the rotary force transfer mechanism comprises a linkage rod that is pivotably attached, at a first, distal end, to the upstroke rack gear and, at a second, proximal end, to the downstroke gear end.

In some embodiments of the rotary force transfer mechanism, the path defined by the guide comprises first, second, third, and fourth parts; movement of the follower of the downstroke rack gear along the first part of the path comprises, relative to the gear, a downstroke motion of the downstroke rack gear and a downstroke-like motion of the upstroke rack gear, the downstroke rack gear being engaged with the gear during an entirety of the downstroke motion and the upstroke rack gear being disengaged from the gear during an entirety of the downstroke-like motion; movement of the follower of the downstroke rack gear along the second part of the path comprises: a disengagement motion of the downstroke rack gear, relative to the gear, in which the downstroke rack gear moves radially away from the gear, such that the rack gear teeth of the downstroke rack gear disengage from the gear teeth; and simultaneously, a reengagement motion of the upstroke rack gear, relative to the gear, in which the upstroke rack gear moves radially towards the gear, such that the rack gear teeth of the upstroke rack gear engage with the gear teeth; movement of the follower of the downstroke rack gear along the third part of the path comprises, relative to the gear, an upstroke motion downstroke rack gear and an upstroke-like motion of the upstroke rack gear, the rack gear teeth of the downstroke rack gear being disengaged from the gear teeth during an entirety of the upstroke motion and the rack gear teeth of the upstroke rack gear being engaged with the gear teeth during an entirety of the upstroke motion, the upstroke motion being in a substantially opposite direction from the downstroke motion; and movement of the follower of the downstroke rack gear along the fourth part of the path comprises a reengagement motion of the downstroke rack gear, relative to the gear, in which the downstroke rack gear moves radially towards the gear, such that the rack gear teeth of the downstroke rack gear engage with the gear teeth; and simultaneously, a disengagement motion of the upstroke rack gear, relative to the gear, in which the upstroke rack gear moves radially away from the gear, such that the rack gear teeth of the upstroke rack gear engage with the gear teeth.

In some embodiments of the rotary force transfer mechanism, the downstroke and upstroke rack gears are pivotably attached to each other by the linkage rod so that the downstroke and upstroke rack gears move simultaneously with each other.

In some embodiments of the rotary force transfer mechanism, the follower is configured to move sequentially through the first, second, third, and fourth parts of the path defined by the guide in a repeatable manner.

According to another example embodiment, a system is provided, the system comprising a plurality of rotary force transfer mechanisms, each such rotary force transfer mechanism comprising: an input configured to receive a substantially linear input force; a rotary structure; and a drive element for selective coupling with the rotary structure to transmit the input force to the rotary structure to cause a corresponding rotary motion of the rotary structure; wherein the drive element engages, when transmitting the input force to the rotary structure, with an outer circumferential surface of the rotary structure such that the input force is transmitted to the rotary structure in a direction tangential to a position where the drive element is coupled to the rotary structure; wherein the plurality of rotary force transfer mechanisms comprises a first rotary force transfer mechanism and a second rotary force transfer mechanism; and wherein the gear of the first rotary force transfer mechanism is attached to the gear of the second rotary force transfer mechanism.

In some embodiments of the system, the gears of the first and second rotary force transfer mechanisms are rigidly fixed to each other, so as to co-rotate with each other and to prevent relative angular movement therebetween.

In some embodiments of the system, the system is a human-powered vehicle.

In some embodiments of the system, the human-powered vehicle is a bicycle.

DETAILED DESCRIPTION

To meet the aforementioned challenges and requirements, disclosed herein are example mechanisms (e.g., 100, 101, 102, 1000, see generally FIGS. 1-12) for improved rotary force transfer or, stated somewhat differently, improved transfer of a generally linear input force, transmitted through an input device (e.g., a pedal or handle) to cause a rotary motion of an output device (e.g., a gear, shaft, etc.). According to the example mechanisms disclosed herein, an input force that is tangentially-oriented to a rotary member (e.g., an input gear) is transferred to the rotary member via an input assembly (e.g., a pedal or handle, along with a linkage that is attached to the input device and is selectively engageable with the rotary member). The motion of the pedal assembly is advantageously linear or substantially linear, at least during the downstroke and upstroke motions of the mechanism, which together constitute a majority (e.g., greater than 50%, greater than 75%, greater than 80%, greater than 90%) of a distance traveled (e.g., by the input device, such as the pedal assembly) during a single input cycle (e.g., including one downstroke and one upstroke). For the input assembly disclosed in the instant application, a pedal is pivotably attached to a linkage, which selectively engages with the rotary member to apply the tangentially-oriented input force to the rotary member during at least a downstroke motion of the input assembly. The input assembly is configured such that, during a return motion of the input assembly (e.g., during an upstroke motion), the linkage is disengaged from (e.g., not in direct contact with) the rotary member during the return motion.

For simplicity of illustration, the example embodiments disclosed herein are shown with only a single input assembly and rotary member in the accompanying figures. While the components shown in the figures can be utilized as shown to form a complete rotary force transfer mechanism, it is advantageous for both ergonomic and efficiency reasons for the components shown in each of the figures to be duplicated along a line of symmetry that is parallel to the viewpoint shown in, for Example, FIG. 2. Such rotary force transfer mechanisms can be referred to as being "dual-input" mechanisms, since there are two input assemblies provided in each such mechanism. In such dual-input mechanisms, the motion of the input assemblies can be independent of each other or in a fixed relationship (e.g., one input assembly must complete an upstroke while the other input assembly completes a downstroke and vice-versa.

Figure 1:
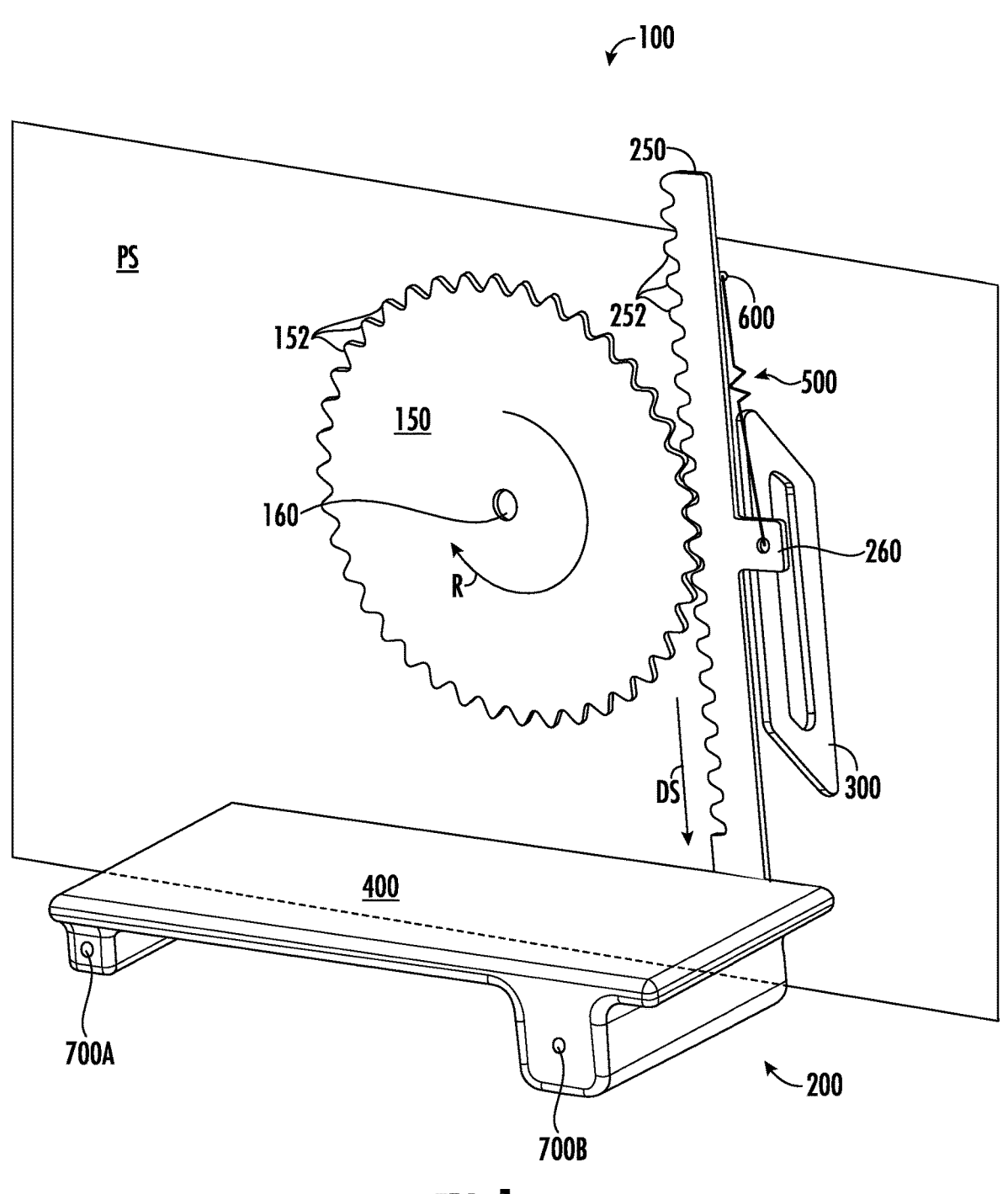
FIG. 1 is an isometric view of an example embodiment of a rotary force transfer mechanism.

An example of this plane of symmetry PS is shown in FIG. 1, with all components shown in the example embodiments of FIGS. 1-10 being duplicated on the opposite side of the plane of symmetry PS from the view shown in FIG. 1. In some embodiments, the guide (i.e., in the form of an enclosed track) may be provided substantially coplanar with the plane of symmetry PS, in which case all of the components shown in the example embodiments of FIGS. 1-10, except for the guide, are duplicated on the opposite side of the plane of symmetry PS, with the movement (e.g., including the respective upstroke and downstroke motions) of both of the input assemblies being controlled by the single guide of such dual-input rotary force transfer mechanism. In some embodiments of the dual-input rotary force transfer mechanisms, the gears arranged on opposite sides of the plane of symmetry PS may be linked together (e.g., via a sprocket or other suitable mechanism, including a rigid connection) to transmit the input power from each of the input assemblies to an output (e.g., a rotary, oscillating, and/or linear output). In some such dual-input rotary force mechanisms, an input force may be provided through only a single input assembly (e.g., to allow for operation by a person unable to simultaneously operate both input assemblies), such as through the use of a sprocket, clutch, or other suitable selectively-engageable device.

Thus, in forming such dual-input rotary force transfer mechanisms, the components shown in the accompanying figures may be duplicated (e.g., so as to be present as substantially mirror images of each other with respect to the plane of symmetry PS), such that there is an identical half-mechanism on the opposite side of the plane of symmetry PS for each example embodiment of the rotary force transfer mechanisms disclosed herein. In such a dual-input system, it is generally ergonomically advantageous, at least such mechanisms are being used by able-bodied human operators, for the downstroke and upstroke motions of the opposite mechanism to alternate with each other or, otherwise, to be opposite each other (e.g., such that one input assembly is in a downstroke motion while the other input assembly is in an upstroke motion). A return mechanism for each input assembly to carry out the upstroke motion can be provided; non-limiting examples of such return mechanisms can include a spring, an external mechanism, a linkage to an identical opposing mechanism so as to move simultaneously with each other 180° out of phase with each other, and the like.

FIG. 1 is an example embodiment of a rotary force transfer mechanism, generally designated 100, comprising a gear 150 that is rotatable about a gear axle 160 in the direction of rotation R, an input assembly, generally designated 200 (e.g., comprising at least the rack gear 250 and the input 400) that is selectively engageable with the gear 150, and a guide 300 for controlling motion of the input assembly 200. The gear 150 comprises a plurality of gear teeth 152 formed about a perimeter of the gear 150. The gear axle 160 is connected to an output device (e.g., a rotatable shaft attached to the side of the gear 150 facing the plane of symmetry PS). In embodiments in which the rotary force transfer mechanism 100 is configured as a dual-input rotary force transfer mechanism 100, comprises at least two gears 100 (e.g., mirrored about the plane of symmetry PS), two input assemblies 200 (e.g., mirrored about the plane of symmetry PS), and either a single guide 300 (e.g., coplanar with the plane of symmetry PS) or two guides 300 that are not coplanar with, but are instead mirrored on opposite sides of the plane of symmetry 300. The gears 100 of each half of such a dual-input rotary force transfer mechanism 100 can be connected to each other (e.g., via a sprocket, rigidly, or in any suitable manner) at and/or using the gear axle 160. Thus, the gear 150 can rotate around and relative to the gear axle 160. The input assembly 200 comprises an input 400 (e.g., a pedal, handle, or other suitable device) and a rack gear 250, which are pivotably attached to each other. The rack gear 250 is advantageously attached at a distal end thereof to the input 400. As shown in the example embodiment shown in FIGS. 1-5, the rack gear 250 is attached to the input 400 at or adjacent to (e.g., at least 80% of the length) an end of the input 400 from where the input 400 is attached in a positionally-fixed, rotatable manner. The rack gear 250 comprises a plurality of rack gear teeth 252 along the length of the rack gear 250, these rack gear teeth 252 being compatible with (e.g., having a same pitch, size, etc.) as the gear teeth 152 formed about the circumference of the gear 150, such that the rack gear teeth 252 can engage with the gear teeth 152 to transmit, through the rack gear 250, a generally linearly input force received at the input 400 tangentially to the gear 150 to produce a rotary movement of the gear 150.

The rack gear 250 comprises a follower 260 that protrudes from the main portion (e.g., the generally longitudinally-extending portion thereof on which the rack gear teeth 252 are formed) of the rack gear 250. The follower 260 engages within (e.g., in a rolling, or sliding, manner) a guide 300. Any suitable manner of engagement of the follower 260 within the guide 300 is contemplated, however, in the example embodiment disclosed herein, the follower 260 has attached thereto, and extending in the direction of the guide 300, a slide bushing that fits securely within the guide 300. In this example embodiment, the guide 300 is generally in the form of a parallelogram, each side of this parallelogram that defines the guide 300 defining one (1) of the four (4) phases of movement that, when performed sequentially, define a single movement cycle of the input assembly 200. The four (4) phases of movement are referred to herein as a downstroke motion DS (see, e.g., FIGS. 1, 2), a disengagement motion DE (see, e.g., FIG. 3), an upstroke motion US (see, e.g., FIG. 4) and a reengagement motion RE (see, e.g., FIG. 5). Thus, the lengths of the sides of the parallelogram that defines the guide 300 over which the disengagement motion DE and reengagement motion RE occur are advantageously shorter than the sides of the parallelogram that defines the guide over which the downstroke motion DS and upstroke motion US occur. Thus, the guide 300 is in the form of a closed track or loop.

The input 400 is attached at a first end so as to be pivotable about a pivot bearing 700A, which is a static bearing (e.g., rigidly attached to a frame or other static, or fixed, structure), while the follower 260 of the rack gear 250 moves within the guide 300. The input 400 and the rack gear 250 are pivotably attached to each other at a mobile (e.g., not static) pivot bearing 700B, at or adjacent to a second end of the input 400. Any suitable type of bearing may be used for the pivot bearings 700A, 700B disclosed herein.

The rotary force transfer mechanism 100 comprises a return mechanism. In the example embodiment shown, the return mechanism is a return spring, generally designated 500, that is connected between the rack gear 250 (e.g., at the follower 260) and a spring anchor point 600, which can be on any suitably rigid structure, including the same structure to which the pivot bearing 700A is attached. Thus, the return spring 500 is elongated (e.g., stretched, made longer) during the sequential downstroke motion DS and disengagement motion DE, thereby generating a return spring force acting generally in the direction of the spring anchor point 600, which causes a generally upward movement of the rack gear corresponding to, sequentially, the upstroke motion US and the reengagement motion RE.

Figure 2:
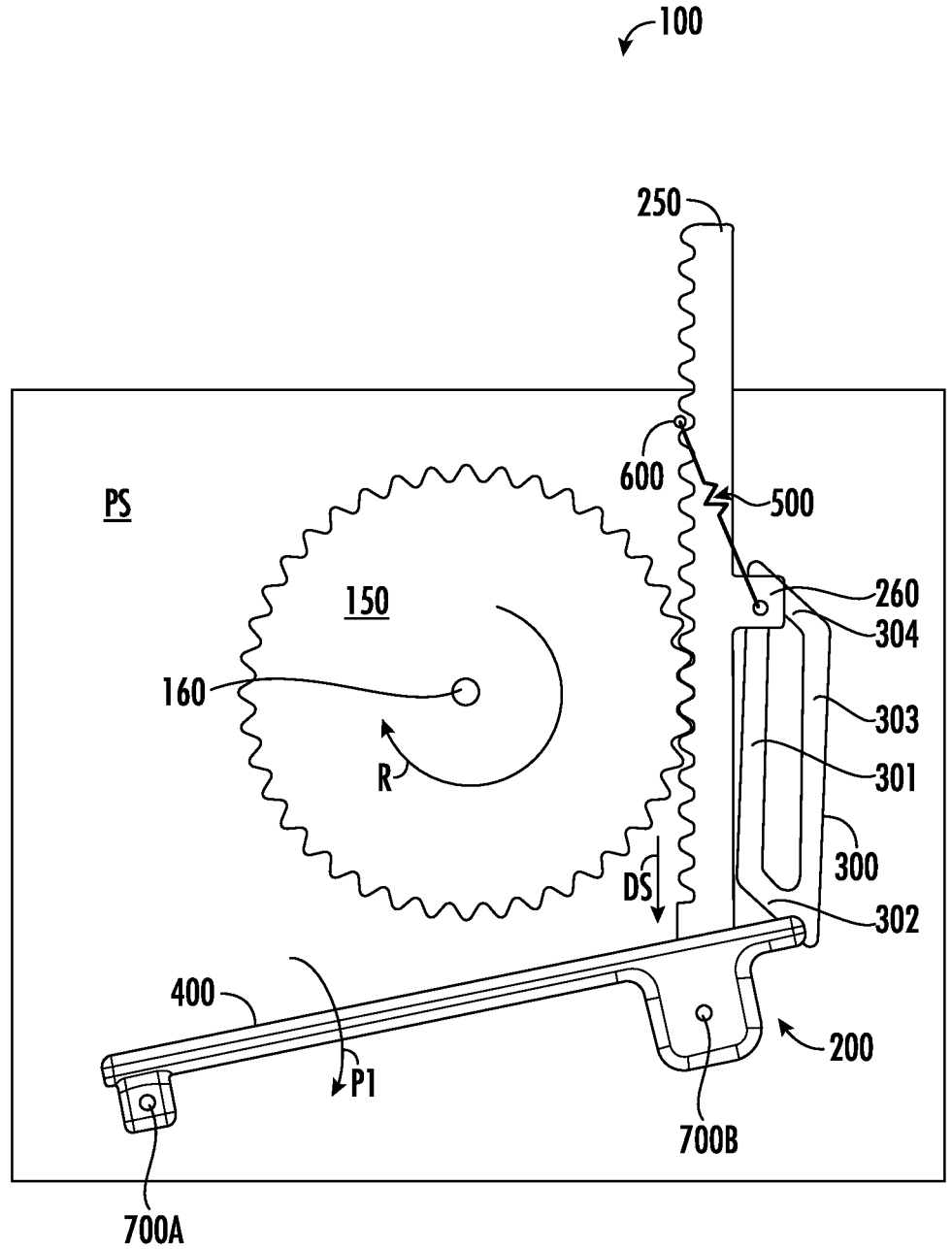
FIGS. 2-5 are respective side views of the example embodiment of the rotary force transfer mechanism of FIG. 1, in which the interaction and relative movements of the components thereof during rotation is shown.

FIG. 2 shows the position for the components of the rotary force transfer mechanism 100 corresponding to the start of a movement cycle, which is defined herein as beginning at the top of the downstroke motion DS. In this position at the beginning of the downstroke motion DS, the rack gear teeth 252 are engaged with the gear teeth 102, such that a linear movement of the rack gear 250 causes a rotary movement of the gear 150 about the gear axle 160. A generally linear force (e.g., such as is caused by extension of a leg of a human operator) is received in the direction of the downstroke motion DS at the input 400. Because the input 400 is pivotably attached at the rear thereof to a static (e.g., immobile) pivot bearing 700A, the input 400 pivots in the direction P1 during the downstroke motion DS. Thus, during the downstroke motion DS, the follower 260 of the rack gear 250 moves along the first part 301 (e.g., "leg") of the guide 300 to impart a linear force to the gear 150 that is generally vertically oriented (e.g., in a direction tangential to the circumference of the gear 150 where the rack gear teeth 252 are engaged with the gear teeth 152), which causes a rotation of the gear 150 in the direction of rotation R. The magnitude of the tangential force exerted by the rack gear 250 to the gear 150 corresponds generally to the magnitude of the input force imparted to the input 400 by the user of the rotary force transfer mechanism 100. The downstroke motion DS continues until the follower 260 (and other components of the rotary force transfer mechanism 100) is in the position shown in FIG. 3, at the end of the first part 301 of the guide 300 and at the beginning of the second part 302 of the guide 300.

Figure 3:
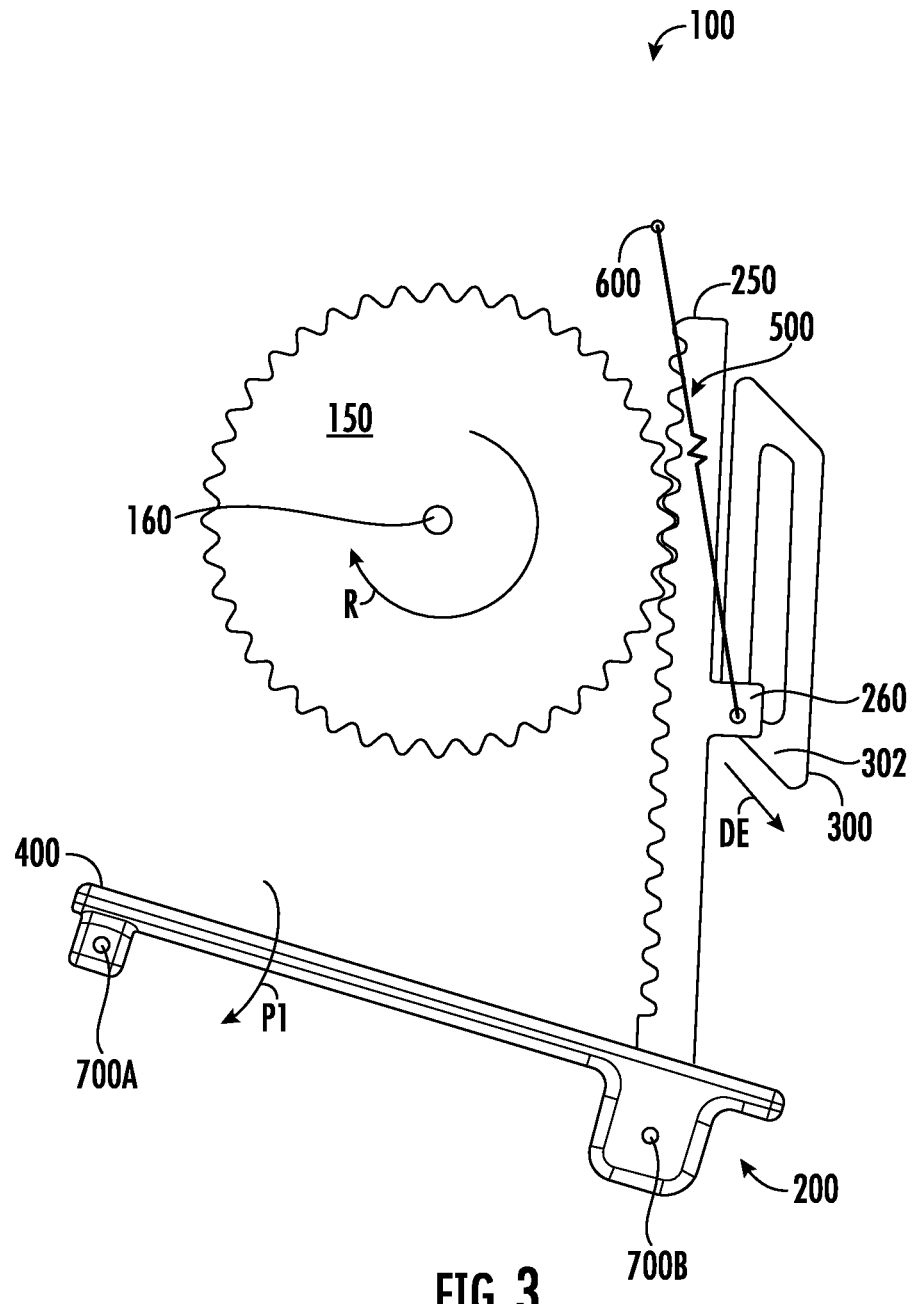

FIG. 3 shows the position for the components of the rotary force transfer mechanism 100 corresponding to a beginning of the disengagement motion DE, in which the rack gear 250 moves from an engaged position, in which the rack gear teeth 252 are engaged with the gear teeth 152, into a disengaged position, in which the rack gear teeth 252 are not engaged with the gear teeth 152. From the position shown in FIG. 3, as the user continues to press down on the input 400, the input 400 will continue to pivot, even if only negligibly, in the direction P1 around the static pivot bearing and, as the follower 260 of the rack gear 250 moves along the second part 302 (e.g., "leg") of the guide 300, the rack gear 250 pivots about the mobile pivot bearing 700B by which the rack gear 250 is connected to the input 400 and move, in a radial direction of the gear 150 (e.g., in a clockwise direction in the view shown in FIG. 3), away from the gear 150, such that the rack gear teeth 252 are no longer engaged with the gear teeth 152. During the disengagement motion DE, no (e.g., negligible) force is transferred from the rack gear 250 to the gear 150. Due to inertia and/or inputs from other mechanisms, the gear 150 will generally continue to rotate in the direction of rotation R during the disengagement motion DE. The disengagement motion DE continues until the follower 260 (and other components of the rotary force transfer mechanism 100) is in the position shown in FIG. 4, at the end of the second part 302 of the guide 300 and at the beginning of the third part 303 of the guide 300.

Figure 4:
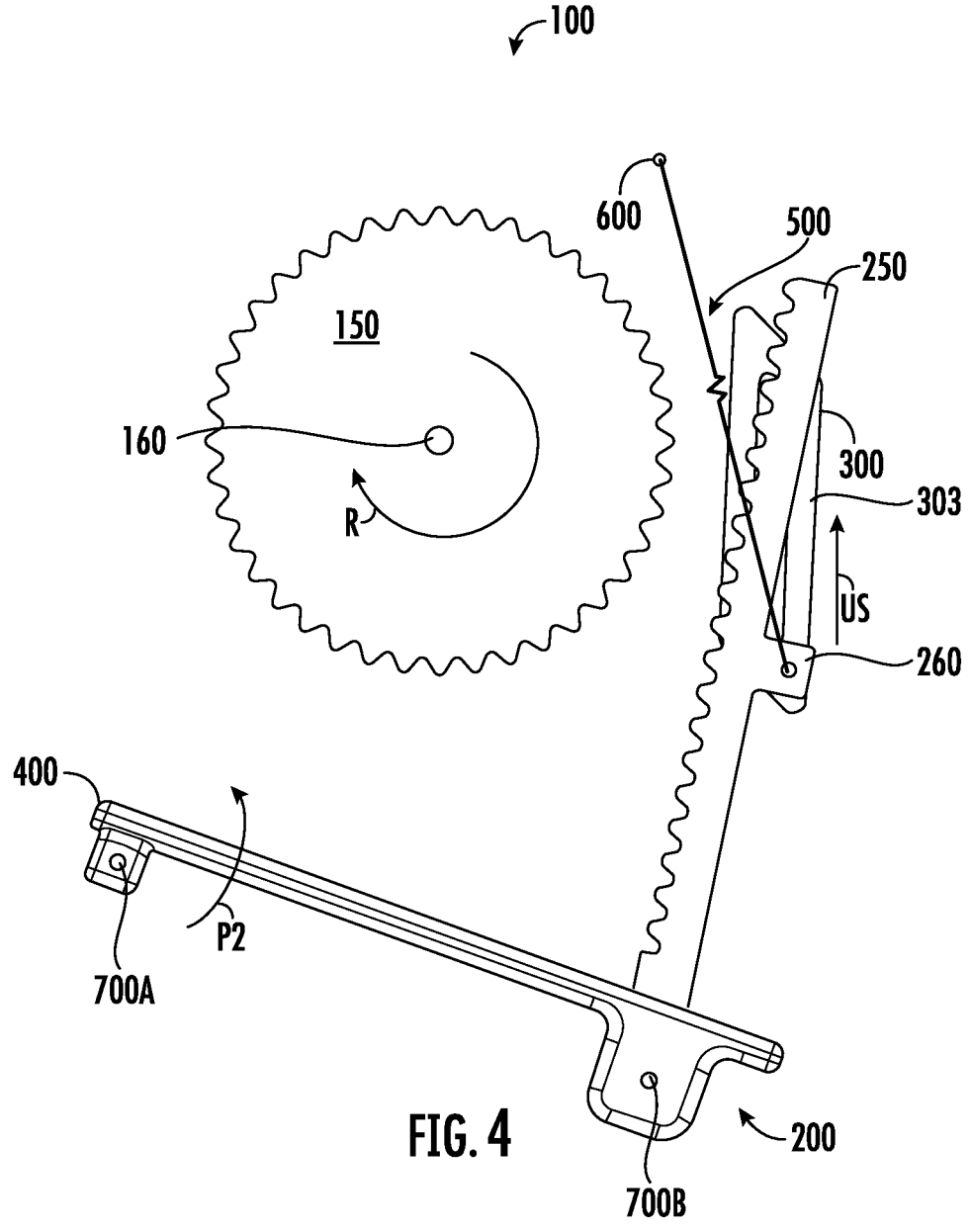

FIG. 4 shows the position for the components of the rotary force transfer mechanism 100 corresponding to a beginning of the upstroke motion US, in which the rack gear teeth 252 are disengaged from the gear teeth 152. The rack gear teeth 252 remain disengaged from the gear teeth 152 during the entirety of the upstroke motion US. From the position shown in FIG. 4, the return spring 500 exerts a return spring force on the rack gear 250, which causes a movement of the follower 260 along the third part 303 (e.g., "leg") of the guide 300, this movement corresponding to the upstroke motion US. During the upstroke motion US, the rack gear 250 moves in a generally vertical direction while also pivoting in the clockwise direction (e.g., from the perspective shown in FIG. 4) relative to the input 400 about the mobile pivot bearing 700B. During the upstroke motion US, the input 400 rotates around the static pivot bearing 700A in the direction P2. Because the rack gear teeth 252 are not engaged with the gear teeth 152 during the upstroke motion US, the gear 150 may continue to rotate in the direction of rotation R, such as may occur due to inertia or other mechanisms. The upstroke motion US continues until the follower 260 (and other components of the rotary force transfer mechanism 100) is in the position shown in FIG. 5, at the end of the third part 303 of the guide 300 and at the beginning of the fourth part 304 of the guide 300.

Figure 5:
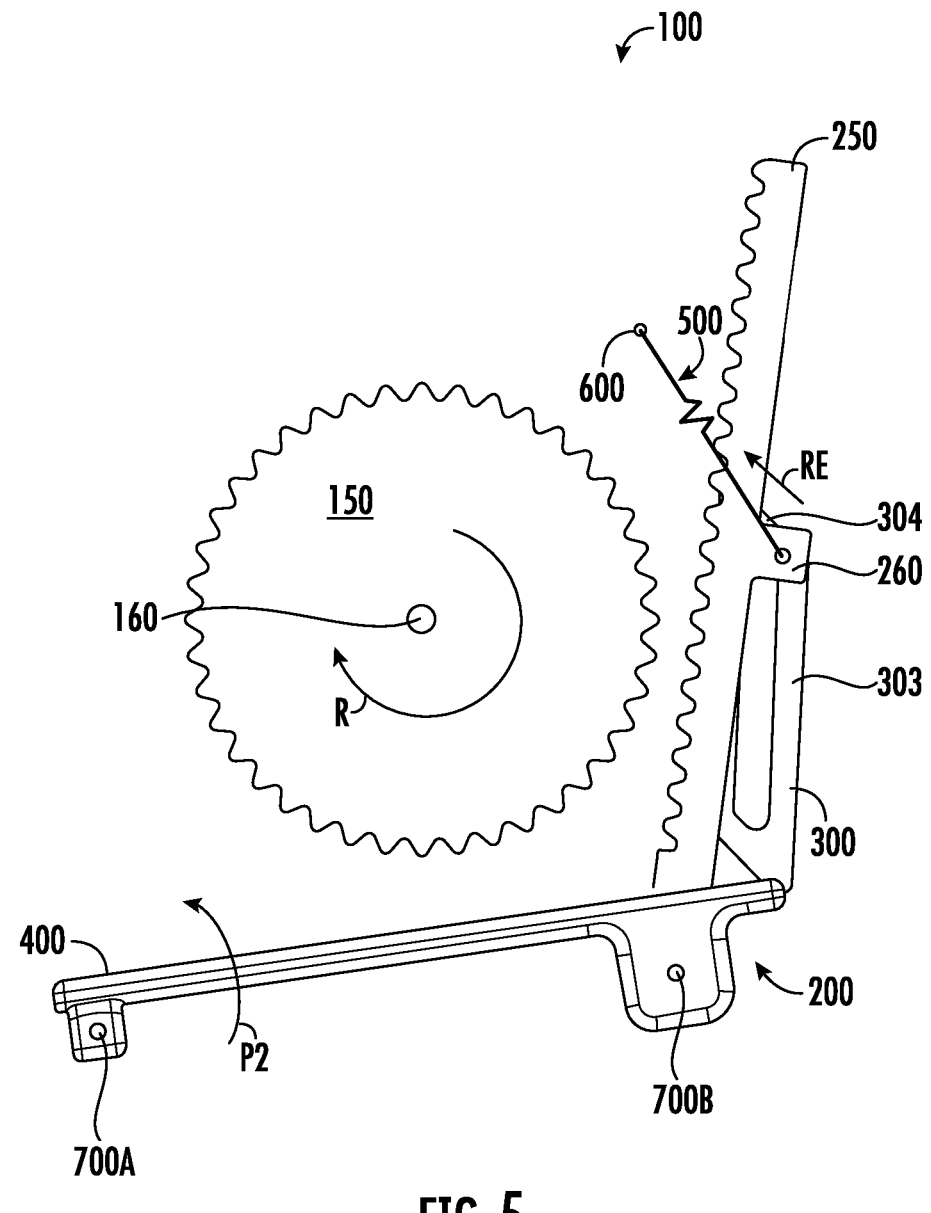

FIG. 5 shows the position for the components of the rotary force transfer mechanism 100 corresponding to a beginning of the reengagement motion RE, in which the rack gear 250 moves from a disengaged position, in which the rack gear teeth 252 are not engaged with the gear teeth 152, into an engaged position, in which the rack gear teeth 252 are engaged with the gear teeth 152. From the position shown in FIG. 5, as the return spring 500 continues to exert a spring force on the rack gear 250, the input 250 will continue to pivot, even if only negligibly, in the direction P2 around the static pivot bearing 700A and, as the follower 260 of the rack gear 250 moves along the fourth part 304 (e.g., "leg") of the guide 300, the rack gear 250 pivots (about the mobile pivot bearing 700B (e.g., in the counterclockwise direction, from the perspective shown in FIG. 5) by which the rack gear 250 is connected to the input 400 and move in a radial direction of the gear 150, such that the rack gear 250 moves towards the gear 150 to cause the rack gear teeth 252 to re-engage with the gear teeth 152. Due to inertia and/or inputs from other mechanisms, the gear will generally continue to rotate in the direction of rotation R during the reengagement motion RE. The reengagement motion RE continues until the follower 260 (and other components of the rotary force transfer mechanism 100) is in the position shown in FIG. 2, at the end of the fourth part 304 of the guide 300 and at the beginning of the first part 301 of the guide 300, at which point the components of the rotary force transfer mechanism 100 are in the proper position to begin another movement cycle, beginning with another downstroke motion DS.

In some embodiments, magnets may be provided at positions within and/or adjacent to the guide 300 to aid the movement of the follower 260 within the guide 300, for example, so that the follower 260 does not reverse direction of movement in the guide 300.

In some embodiments, the gear 150 can be in the form generally of a sprocket of a conventional pedaling mechanism found on most bicycles. In some such sprocket-like embodiments, thus, instead of the gear 150 engaging with a chain for force transfer, the sprocket-like gear 150 engages a rack gear 250 during the downstroke of the input 400 (e.g., pedal). Unlike in such conventional pedaling mechanisms, the input 400 is not directly attached to the sprocket-like gear 150, but instead is only in contact with the sprocket-like gear 150 via one or more rack gears 250. FIGS. 2-5 show the respective positions of the input 400 and the rack gear 250 as the rack gear 250 sequentially engages with and pulls down on the sprocket-like gear 150 to cause a driven rotation of the sprocket-like gear 150 about the gear axle 160, then the rack gear 250 disengages from the sprocket-like gear 150 at the bottom of the travel of the input 400 to a follower 260 of the rack gear 250 held captive and mobile within a guide 300 (e.g., a closed track-like structure), and, finally, the rack gear 250 undergoes an upstroke motion US to a point where the rack gear 250 reengages with the sprocket-like gear 150 in preparation for another powered downstroke motion DS.

Figure 6:
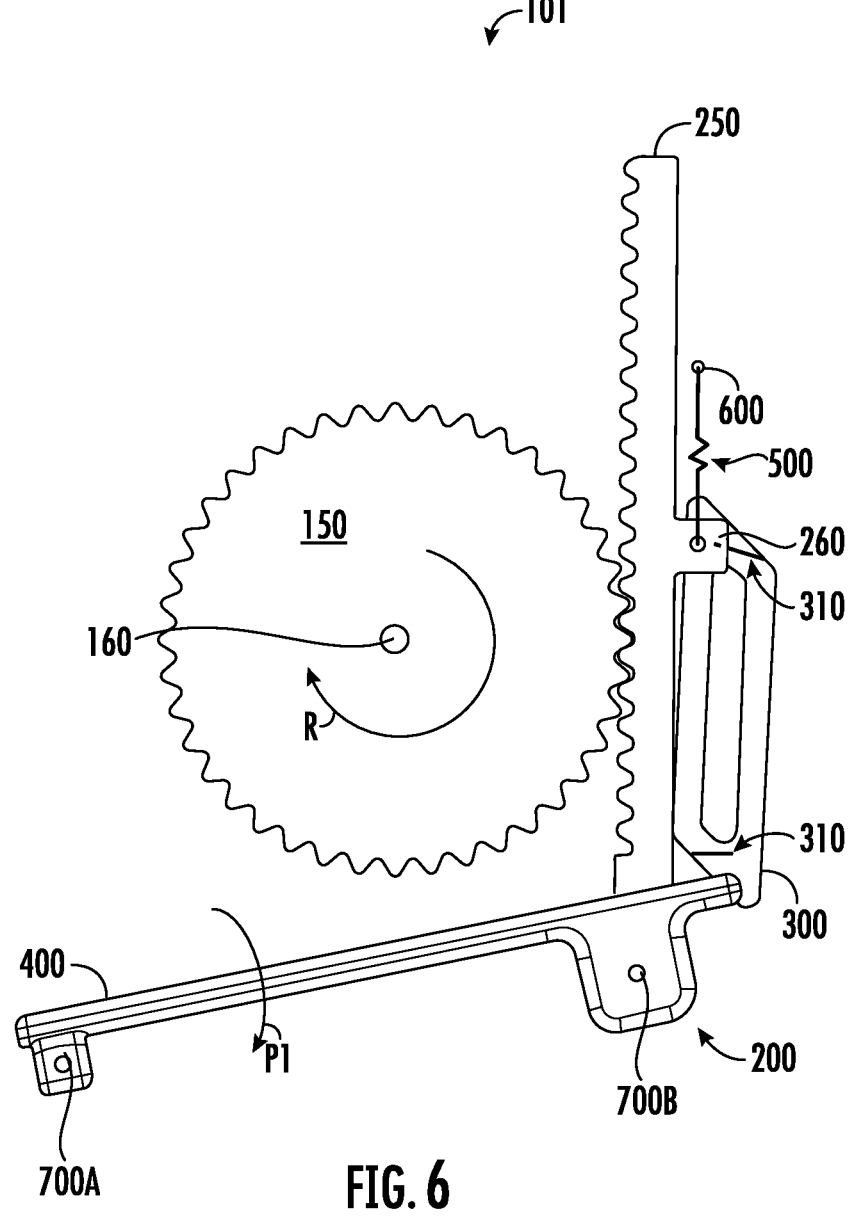
FIGS. 6 and 7 are side views of another example embodiment of a rotary force transfer mechanism.
Figure 7:
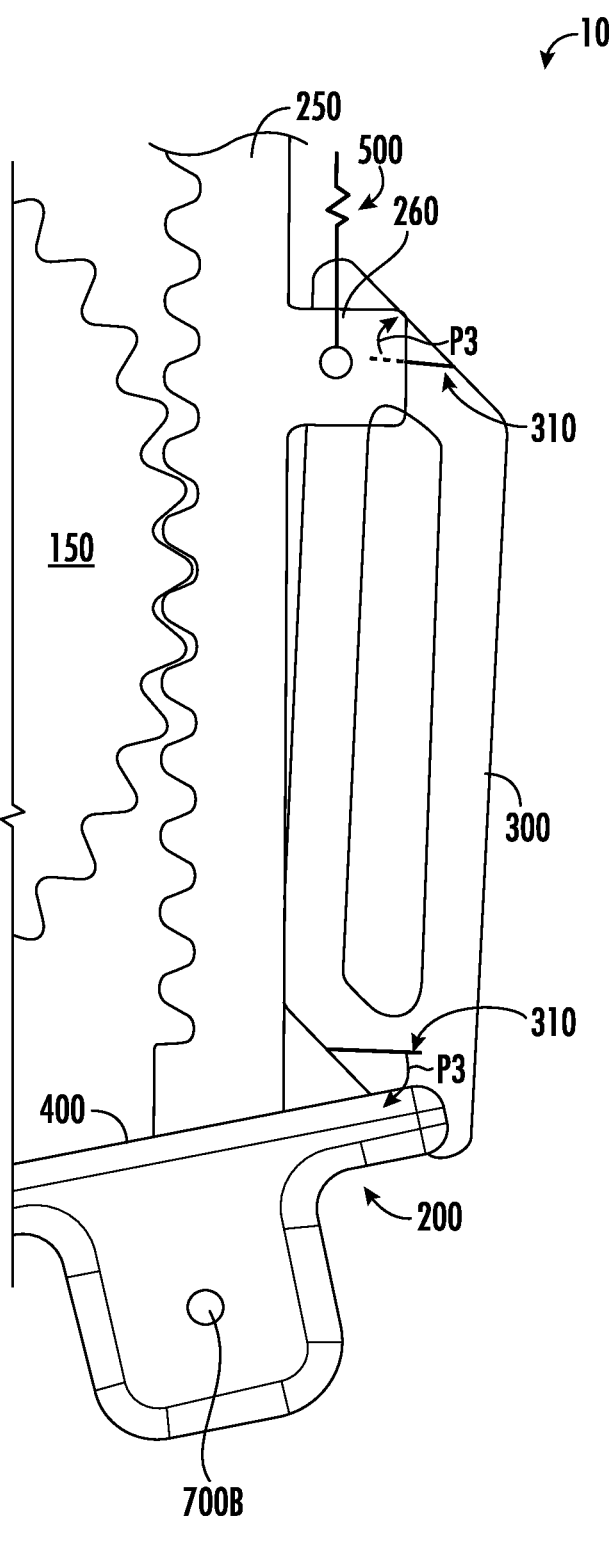

An alternate example embodiment of the rotary force transfer mechanism 100 of FIGS. 1-5 is shown in FIGS. 6 and 7, the rotary force transfer mechanism shown in FIGS. 6 and 7 being generally designated 101. In this example embodiment of the rotary force transfer mechanism 101, like structures are substantially similar to those described with respect to the rotary force transfer mechanism 100 unless stated or clearly illustrated otherwise herein. In rotary force transfer mechanism 101, the return spring 500 is oriented substantially coaxial with the direction of extension of the first part 301 (e.g., the part corresponding to the downstroke motion DS) of the guide 300. Follower guides, generally designated 310, are provided within the second and fourth parts 302, 304 of the guide 300. The follower guides 310 are configured to prevent movement of the follower 260 along the guide 300 in the reverse direction from the disengagement motion DE and the reengagement motion RE, respectively. The follower guides 310 can take any form but, in the example embodiment shown, the follower guides 310 are in the form or pivotable wall-like structures that extend, when in the deployed position (shown in FIGS. 6 and 7), to obstruct a portion of the guide 300 to prevent a reverse movement of the follower 260 along the guide 300. The follower guides 310 can be spring-loaded to remain in the deployed position unless a pivoting movement thereof is caused by passage of the follower 260 through the corresponding part (e.g., second or fourth part 302, 304) of the guide 300 during the disengagement or reengagement motions DE, RE. Thus, when the follower 260 moves along the disengagement or reengagement motions DE, RE, the follower guides 310 pivot in the direction P3 when contacted by the follower 260 (e.g., by a bushing attached to the follower 260) to allow for passage of the follower 260 along the guide 300 to complete the designated disengagement or reengagement motion DE, RE.

Another example embodiment of a rotary force transfer mechanism, generally designated 102, is shown in FIGS. 8-11. In this example embodiment of the rotary force transfer mechanism 102, like structures are substantially similar to those described with respect to the rotary force transfer mechanisms 100, 101 unless stated or clearly illustrated otherwise herein. Similar to the example embodiments shown in FIGS. 1-7, the rotary force transfer mechanism 102 shown in FIGS. 8-11 comprises a first rack gear, which is referred to as the downstroke rack gear 250D or as the "primary rack gear." The downstroke rack gear 250D has a follower 260 that engages (e.g., by a bushing fixedly attached thereto) within a guide 300 to control selective engagement of the downstroke rack gear 250D with the gear 150. The downstroke rack gear 250D is pivotably connected to the input 400 (e.g., a pedal) at a first mobile pivot bearing 700B. The downstroke rack gear 250D is connected, via a linkage rod 350, with a second rack gear, which is referred to as the upstroke rack gear 250U or as the "secondary rack gear." Since the downstroke rack gear 250D is connected with the upstroke rack gear 250U via the linkage bar 350, engagement and disengagement of the downstroke and upstroke rack gears 250D, 250U, respectively, from the gear 250 is controlled in an alternating manner. Thus, when the downstroke rack gear 250D is engaged with the gear 150, the upstroke rack gear 250U is disengaged from the gear 150 and, when the upstroke rack gear 250U is engaged with the gear 150, the downstroke rack gear 250D is disengaged from the gear 150. In some embodiments, the linkage rod 350 has a length such that, during at least a portion of travel of the follower 260 along the second and fourth parts 302, 304 (see, e.g., FIGS. 3 and 5) of the guide 300 (e.g., corresponding to the respective disengagement and reengagement motions DS, US), both of the downstroke and upstroke rack gears 250D, 250U are disengaged from (e.g., partially and/or entirely) the gear 150. The upstroke rack gear 250U is connected to the input 400 at a second mobile pivot bearing 700C. The input 400 is pivotably attached to a static pivot bearing 700A at a rear edge of the input 400, substantially similarly to that which is shown in FIGS. 1-7. As used herein, the terms "engaged" refers generally to a position in which one of the downstroke and upstroke rack gears 250D, 250U are frictionally engaged with (e.g., by enmeshing of complementarily-shaped rack gear teeth 252 provided on each of the downstroke and upstroke rack gears 250D, 250U with the gear teeth 152, the gear teeth 152 being interlocked with the rack gear teeth 252 in such enmeshed engagement).

In this example embodiment of the rotary force transfer mechanism 102, the guide 300 is generally in the form of a parallelogram, each side of this parallelogram that defines the guide 300 defining one (1) of the four (4) phases of movement that, when performed sequentially, define a single movement cycle of the input assembly 200. The four (4) phases of movement are referred to herein as a downstroke motion DS for the downstroke rack gear 250D and a downstroke-like motion DS' for the upstroke rack gear 250U (see, e.g., FIG. 8), a disengagement motion DE for the downstroke rack gear 250D and a reengagement motion RE' for the upstroke rack gear 250U (see, e.g., FIG. 9) an upstroke motion US for the downstroke rack gear 250D and an upstroke-like motion US' for the upstroke rack gear 250U (see, e.g., FIG. 10), and a reengagement motion RE for the downstroke rack gear 250D and a disengagement motion DE' for the upstroke rack gear 250U (see, e.g., FIG. 11).

Figure 8:
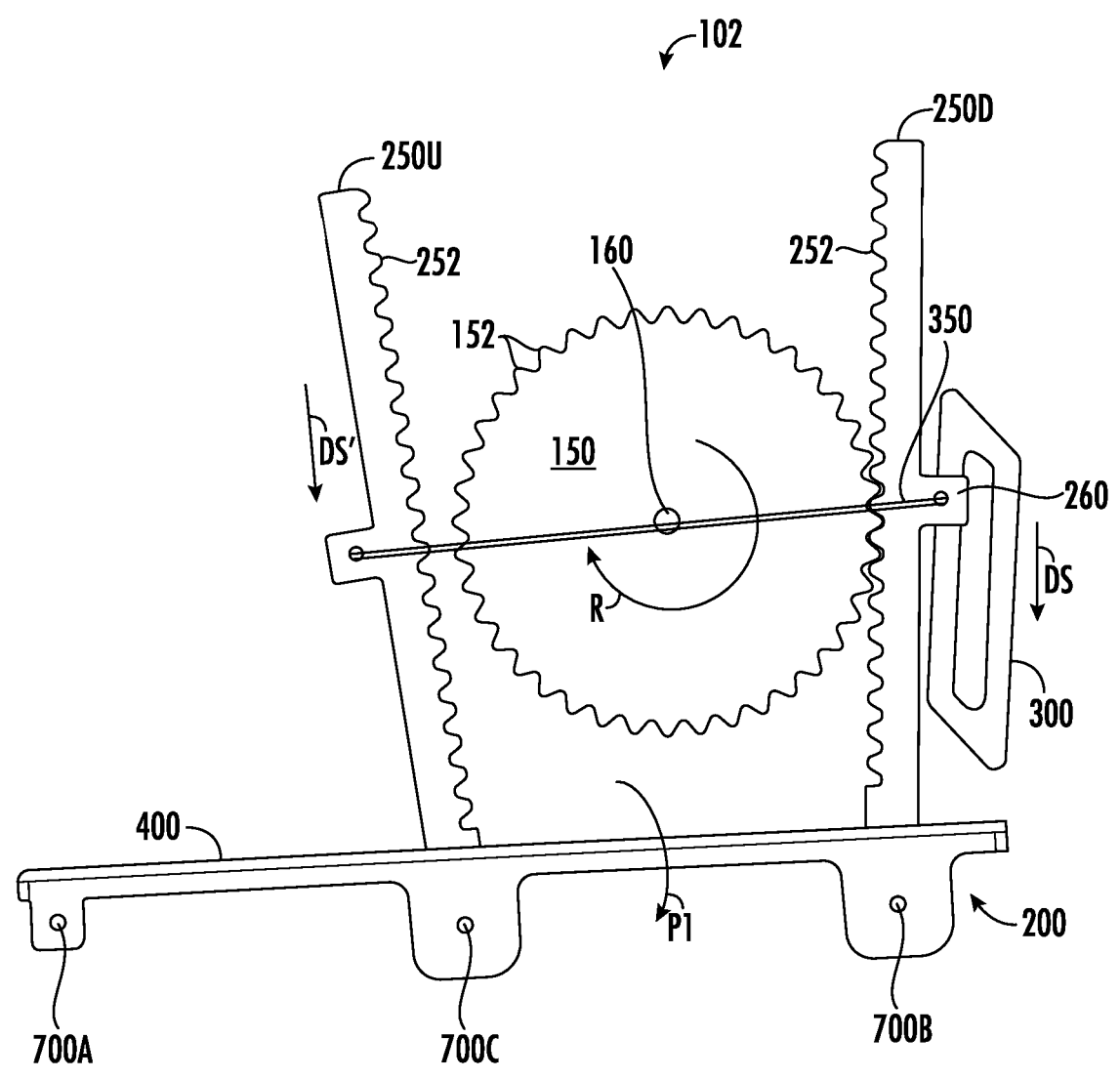
FIGS. 8-11 show aspects of another example embodiment of a rotary force transfer mechanism, in which the interaction and relative movements of the components thereof during rotation is shown.

FIG. 8 shows the position for the components of the rotary force transfer mechanism 100 corresponding to an initialization position for a movement cycle for the components of the rotary force transfer mechanism 100, each movement cycle beginning with a downstroke motion DS of the downstroke rack gear 250D. During substantially the entirety of the downstroke motion DS, the teeth 252 of the downstroke rack gear 250D are engaged with the gear teeth 152.

From the position shown in FIG. 8, the upstroke rack gear 250U, which is disengaged from (e.g., not in direct contact with) the gear 150, undergoes a corresponding downstroke-like motion DS' due to the connection of the upstroke rack gear 250U to the input 400 at the second mobile pivot bearing 700C and also to the downstroke rack gear 250D via the linkage rod 350. The downstroke-like motion DS' of the upstroke rack gear 250U is largely similar to, but not identical to, the downstroke motion DS of the downstroke rack gear 250D. At the beginning of each movement cycle, a generally linear force (e.g., such as is caused by extension of a leg of a human operator) is received at the input 400 in the direction of the downstroke motion DS. Because the input 400 is pivotably attached at the rear thereof to a static (e.g., immobile) pivot bearing 700A, the input 400 pivots in the direction P1 about the static pivot bearing 700A during the downstroke motion DS (and also, necessarily, during the downstroke-like motion DS'). Thus, during the downstroke motion DS, the follower 260 of the downstroke rack gear 250D moves along the first part 301 (e.g., "leg") of the guide 300, in a manner such that a linear force is imparted, through the rack gear teeth 252 of the downstroke rack gear 250D, to the gear 150; this linear force is generally vertically-oriented (e.g., being directed in a direction tangential to the circumference of the gear 150 at the position on the perimeter of the gear 150 where the downstroke rack gear 250D is in contact with the gear 150). The vertical orientation of the linear force causes a corresponding rotation of the gear 150 in the direction R. The magnitude of the tangentially-applied force received at the gear 150 corresponds generally to the magnitude of the input force received at the input 400 by a user of the rotary force transfer mechanism 102. The downstroke motion DS and the corresponding downstroke-like motion DS' each continue until the follower 260 (and other components of the rotary force transfer mechanism 102) is in the position shown in FIG. 9, at the end of the first part 301 of the guide 300 and at the beginning of the second part 302 of the guide 300.

In the example embodiment shown in FIGS. 8-11, the rotary force transfer mechanism comprises only one follower 260 that engages with the guide 300 for controlling movement of the downstroke and upstroke rack gears 250D, 250U. In this example embodiment, the follower 260 is formed on (e.g., in a monolithic or unitary manner) the downstroke rack gear 250D. Thus, the motion of the upstroke rack gear 250U is controlled only through the linkage rod 350, by which the upstroke rack gear 250U is attached (e.g., rigidly) to the downstroke rack gear 250D, and the pivoting movement of the input about the static pivot bearing 700A, to which the upstroke rage gear 250U is attached at the second mobile pivot bearing 700C.

Figure 9:
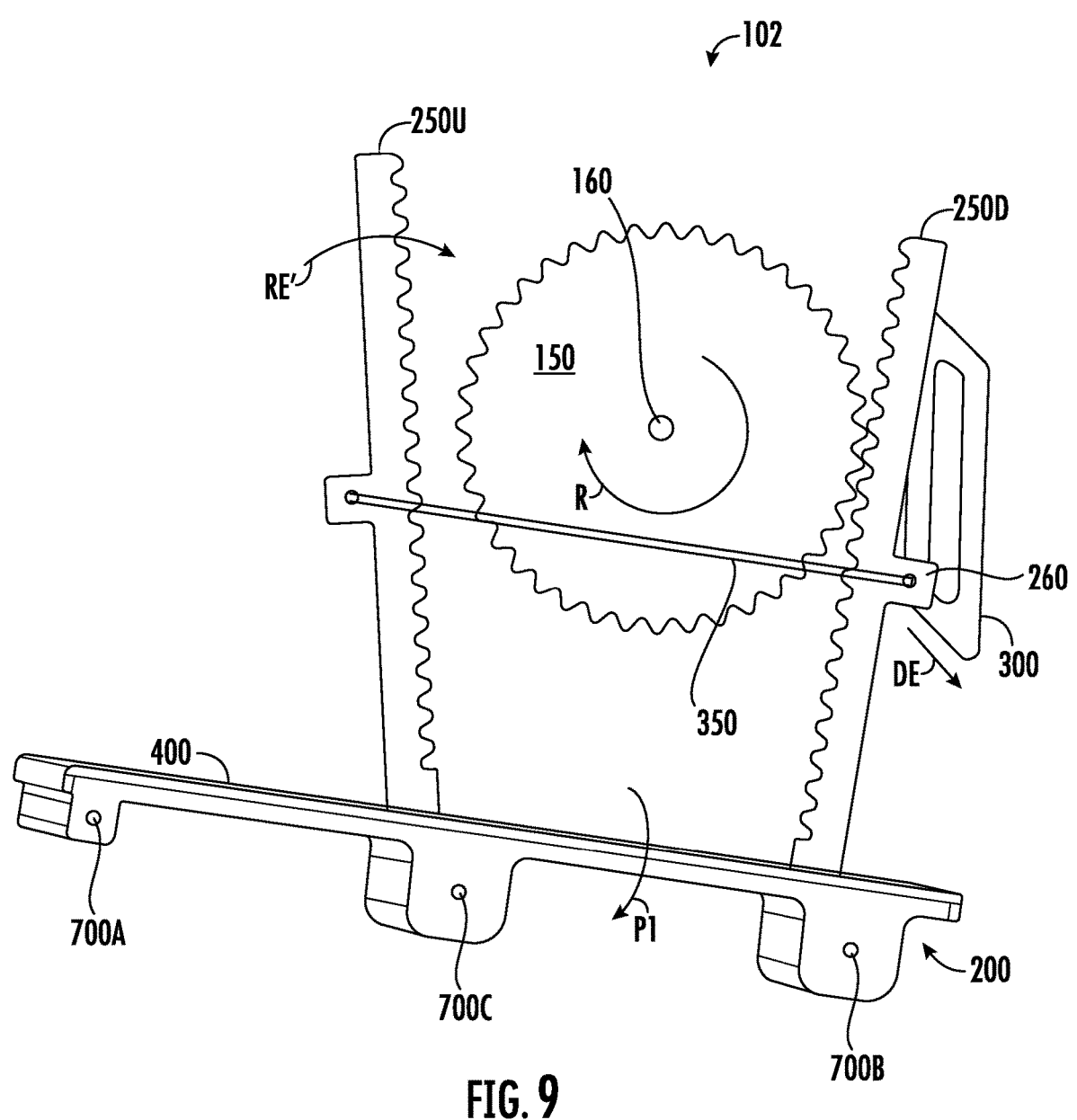

FIG. 9 shows the position for the components of the rotary force transfer mechanism 102 corresponding to a beginning of a second portion of the movement cycle, the second portion comprising the disengagement motion DE of the downstroke rack gear 250D and the reengagement motion RE' of the upstroke rack gear 250U. In the disengagement motion DE, the rack gear teeth 252 of the downstroke rack gear 250D move from an engaged position, in which the rack gear teeth 252 are engaged with (e.g., in direct contact) the gear teeth 152, into a disengaged position, in which the rack gear teeth 252 are not engaged with (e.g., spaced apart from) the gear teeth 152.

From the position shown in FIG. 9, the upstroke rack gear 250U, which is disengaged from the gear 150 at the beginning of the second portion of the movement cycle, undergoes a corresponding reengagement motion RE' due to the connection of the upstroke rack gear 250U to the input 400 through the second mobile pivot bearing 700C and also to the downstroke rack gear 250D through the linkage rod 350. Thus, during disengagement of the rack gear teeth 252 of the downstroke rack gear 250D from the gear teeth 152 during the disengagement motion DE, the upstroke rack gear 250U is simultaneously pivoted into an engagement position, in which the rack gear teeth 252 of the upstroke rack gear 250U are engaged with (e.g., in direct contact) the gear teeth 152 (e.g., on an opposite side of the gear 150 from the downstroke rack gear 250D), such that the rotational inertia of the gear 150 can aid in the performance of an upstroke motion of the rotary force transfer mechanism 102 during a third portion of the movement cycle. While both the disengagement motion DE of the downstroke rack gear 250D and the reengagement motion RE' of the upstroke rack gear 250U have linear and rotary motion aspects, the rotational aspect, or component, of the reengagement motion RE' is greater than the rotational aspect, or component, of the disengagement motion DE.

From the position shown in FIG. 9, as the user continues to press down on the input 400, the input 400 continues to pivot, even if only negligibly, in the direction P1 around the static pivot bearing 700A and, as the follower 260 of the downstroke rack gear 250D moves along the second part 302 (e.g., "leg") of the guide 300, the downstroke rack gear 250D pivots about the first mobile pivot bearing 700B, by which the downstroke rack gear 250D is connected to the input 400, and move, in a radial direction of the gear 150, away from the gear 150, such that the rack gear teeth 252 of the downstroke rack gear 250D are no longer engaged with the gear teeth 152; simultaneously, due to both the connection of the upstroke rack gear 250U to the downstroke rack gear 250D through the linkage rod 350 and the connection of the upstroke rack gear 250U to the input 400 at the second mobile pivot bearing 700C, the upstroke rack gear 250U pivots about the second mobile pivot bearing 700C and moves, in the radial direction of the gear 250, towards the gear 250. During the disengagement motion DE, no (e.g., negligible) force is imparted to the gear 150 from the downstroke rack gear 250D. Due to inertia and/or inputs from other mechanisms, the gear 150 may generally continue to rotate in the direction R during the disengagement motion DE of the downstroke rack gear 250D and the reengagement motion RE' of the upstroke rack gear 250U. The disengagement motion DE of the downstroke rack gear 250D and the reengagement motion RE' of the upstroke rack gear 250U each continue until the follower 260 (and other components of the rotary force transfer mechanism 102) is in the position shown in FIG. 10, at the end of the second part 302 of the guide 300 and at the beginning of the third part 303 of the guide 300.

Figure 10:

FIG. 10 shows the position for the components of the rotary force transfer mechanism 102 corresponding to a beginning of a third portion of the movement cycle, the third portion comprising the upstroke motion US of the downstroke rack gear 250D and the upstroke-like motion US' of the upstroke rack gear 250U. The rack gear teeth 252 of the downstroke rack gear 250D remain disengaged from the gear teeth 152 during the entirety of the upstroke motion US of the downstroke rack gear 250D. From the position shown in FIG. 10, the upstroke rack gear 250U, the gear teeth 252 of which are engaged with the gear teeth 152, undergoes the corresponding upstroke-like motion US' due to the connection of the upstroke rack gear 250U to the input 400 at the second mobile pivot bearing 700C and to the downstroke rack gear 250D through the linkage rod 350. The upstroke-like motion US' of the upstroke rack gear 250U is largely similar to, but not identical to, the downstroke motion DS of the downstroke rack gear 250D. The rack gear teeth 252 of the upstroke rack gear 250u remain engaged with the gear teeth 152 during the entirety of the upstroke-like motion US'.

From the position shown in FIG. 10, the continued rotation of the gear 150 in the direction R imparts a "return" force to the upstroke rack gear 250U, which in turn causes a movement of the upstroke rack gear 250U in a generally vertical direction (e.g., a direction tangential to the circumference of the gear 150 where the rack gear teeth 252 of the upstroke rack gear 250U are in contact with the gear teeth 152). In some embodiments, the input 400 may be configured to receive an upstroke input force (e.g., by formation of a rigid connection of the input to the foot of the user, such as through a shoe worn by the user) that causes the input 400 to pivot in the direction P2, such that a rotary force can be imparted to the gear 150 during both the downstroke motion DS of the downstroke rack gear 250D and the upstroke-like motion US' of the upstroke rack gear 250U. The upstroke-like motion US' of the upstroke rack gear 250U causes, through the connection of the linkage rod 350 with the downstroke rack gear 250D and also through the connection of the downstroke and upstroke rack gears 250D, 250U to the input 400 through the respective first and second mobile pivot bearings 700B, 700C, a corresponding movement of the follower 260 along the third part 302 (e.g., "leg") of the guide 300 during the upstroke motion US of the downstroke rack gear 250U, during which the downstroke rack gear 250D moves in a generally vertical direction while also pivoting in the clockwise direction relative to the input 400 about the first mobile pivot bearing 700B. During the upstroke-like motion US' of the upstroke rack gear 250U, the upstroke rack gear 250U also pivots relative to the input 400 about the second mobile pivot bearing 700C. During the upstroke motion US of the downstroke rack gear 250D and the upstroke-like motion US' of the upstroke rack gear 250U, the input 400 rotates around the static pivot bearing 700A in the direction P2. The upstroke motion US of the downstroke rack gear 250D and the upstroke-like motion US' of the upstroke rack gear 250U each continue until the follower 260 (and other components of the rotary force transfer mechanism 102) is in the position shown in FIG. 11, at the end of the third part 303 of the guide 300 and at the beginning of the fourth part 304 of the guide 300.

Figure 11:
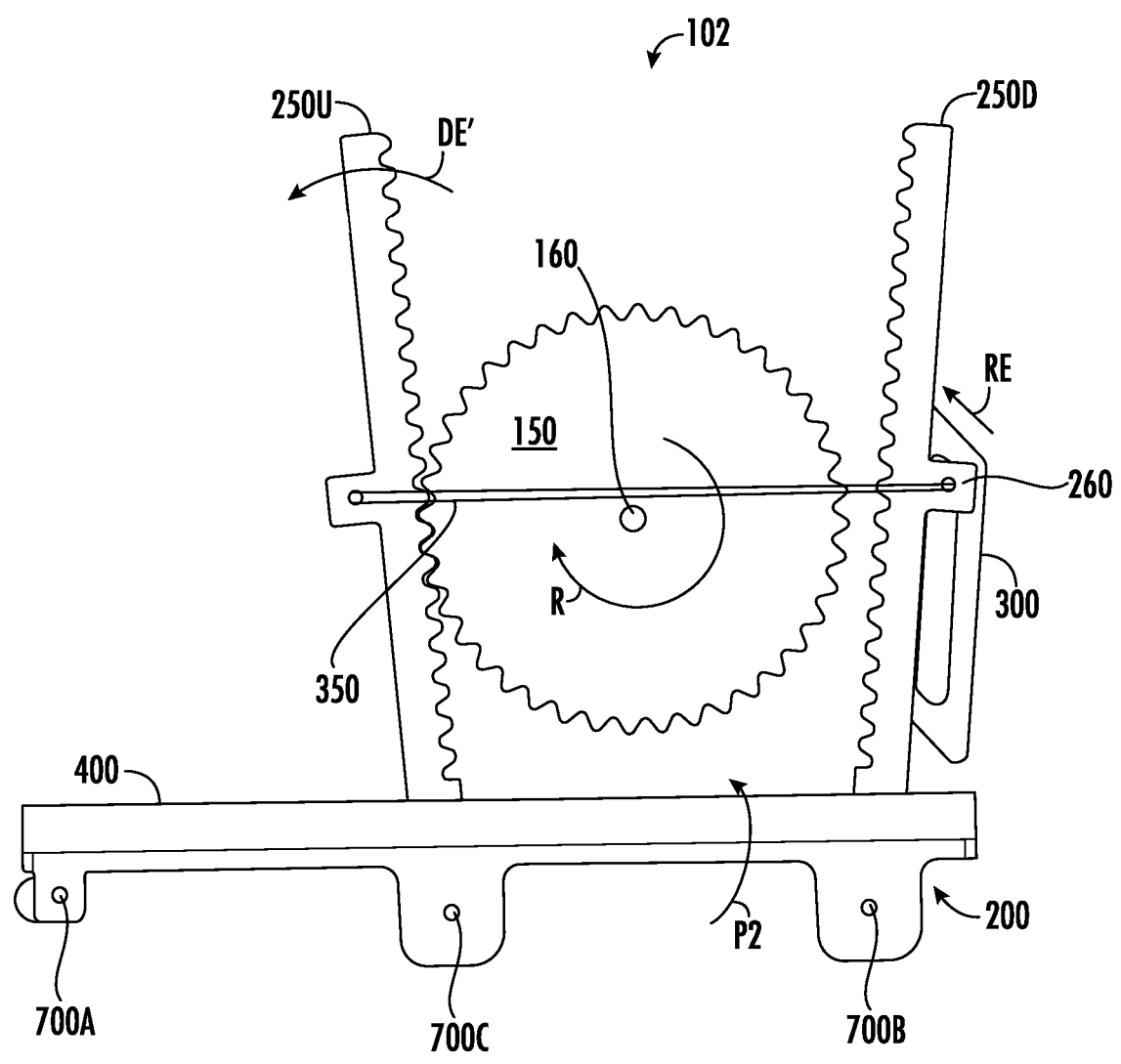

FIG. 11 shows the position for the components of the rotary force transfer mechanism 102 corresponding to a beginning of a fourth portion of the movement cycle, the fourth portion comprising the reengagement motion RE of the downstroke rack gear 250D and the disengagement motion DE' of the upstroke rack gear 250U. In the reengagement motion RE, the rack gear teeth 252 of the downstroke rack gear 250D, move from a disengaged position, in which the rack gear teeth 252 of the downstroke rack gear 250D are not engaged with (e.g., spaced apart from) the gear teeth 152, into an engaged position, in which the rack gear teeth 252 of the downstroke rack gear 250D are engaged with (e.g., in direct contact) the gear teeth 152.

From the position shown in FIG. 11, the upstroke rack gear 250U, which is engaged with the gear 150 at the beginning of the fourth portion of the movement cycle, undergoes a corresponding disengagement motion DE' due to the connection of the upstroke rack gear 250U to the input 400 through the second mobile pivot bearing 700C and also to the downstroke rack gear 250D through the linkage rod

350. Thus, during reengagement of the rack gear teeth 252 of the downstroke rack gear 250D with the gear teeth 152 during the reengagement motion RE, the upstroke rack gear 250U is simultaneously pivoted into a disengagement position, in which the rack gear teeth 252 of the upstroke rack gear 250U are disengaged from (e.g., spaced apart from) the gear teeth 152 (e.g., on an opposite side of the gear 150 from the downstroke rack gear 250D). While both the reengagement motion RE of the downstroke rack gear 250D and the disengagement motion DE' of the upstroke rack gear 250U have linear and rotary motion aspects, the rotational aspect, or component, of the disengagement motion DE' is greater than the rotational aspect, or component, of the reengagement motion RE.

From the position shown in FIG. 11, the continued engagement of the rack gear teeth 252 of the upstroke rack gear 250U with the gear teeth 152, as well as inertia of the components of the rotary force transfer mechanism 102, causes the input 400 to continue to pivot, even if only negligibly, in the direction P2 around the static pivot bearing 700A and, as the follower 260 of the downstroke rack gear 250D moves along the fourth part 304 (e.g., "leg") of the guide 300, the downstroke rack gear 250D pivots about the first mobile pivot bearing 700B, by which the downstroke rack gear 250D is connected to the input 400, and move, in a radial direction of the gear 150, towards the gear 150, such that the rack gear teeth 252 of the downstroke rack gear 250D engage (e.g., directly) with the gear teeth 152; simultaneously, due to both the connection of the upstroke rack gear 250U to the downstroke rack gear 250D through the linkage rod 350 and the connection of the upstroke rack gear 250U to the input 400 at the second mobile pivot bearing 700C, the upstroke rack gear 250U pivots about the second mobile pivot bearing 700C and moves, in the radial direction of the gear 150, away from the gear 150. Due to inertia and/or inputs from other mechanisms, the gear 150 may generally continue to rotate in the direction R during the reengagement motion RE of the downstroke rack gear 250D and the disengagement motion DS' of the upstroke rack gear 250U. The reengagement motion RE and the disengagement motion DE' each continue until the follower 260 (and other components of the rotary force transfer mechanism 102) is in the position shown in FIG. 8, at the end of the fourth part 304 of the guide 300 and at the beginning of the first part 301 of the guide 300, at which point the components of the rotary force transfer mechanism 102 are in the proper position to begin another movement cycle, beginning with another downstroke motion DS and downstroke-like motion DS' of the downstroke rack gear 250D and the upstroke rack gear 250U, respectively.

In some embodiments of the rotary force transfer mechanism 102, the upstroke rack gear 250U comprises a follower 260, in addition to or instead of the follower 260 on the downstroke rack gear 250D, the follower 260 of the upstroke rack gear 250U being configured to engage within and move along a predefined path in a second guide track, which can be located on an opposite side of the gear 150.

In the example embodiment shown in each of FIGS. 1-11, each of the first portion 301, the second portion 302, the third portion 303, and the fourth portion 304 of the movement cycle are linear (e.g., each forming one of the sides of a parallelogram).

Figure 12:
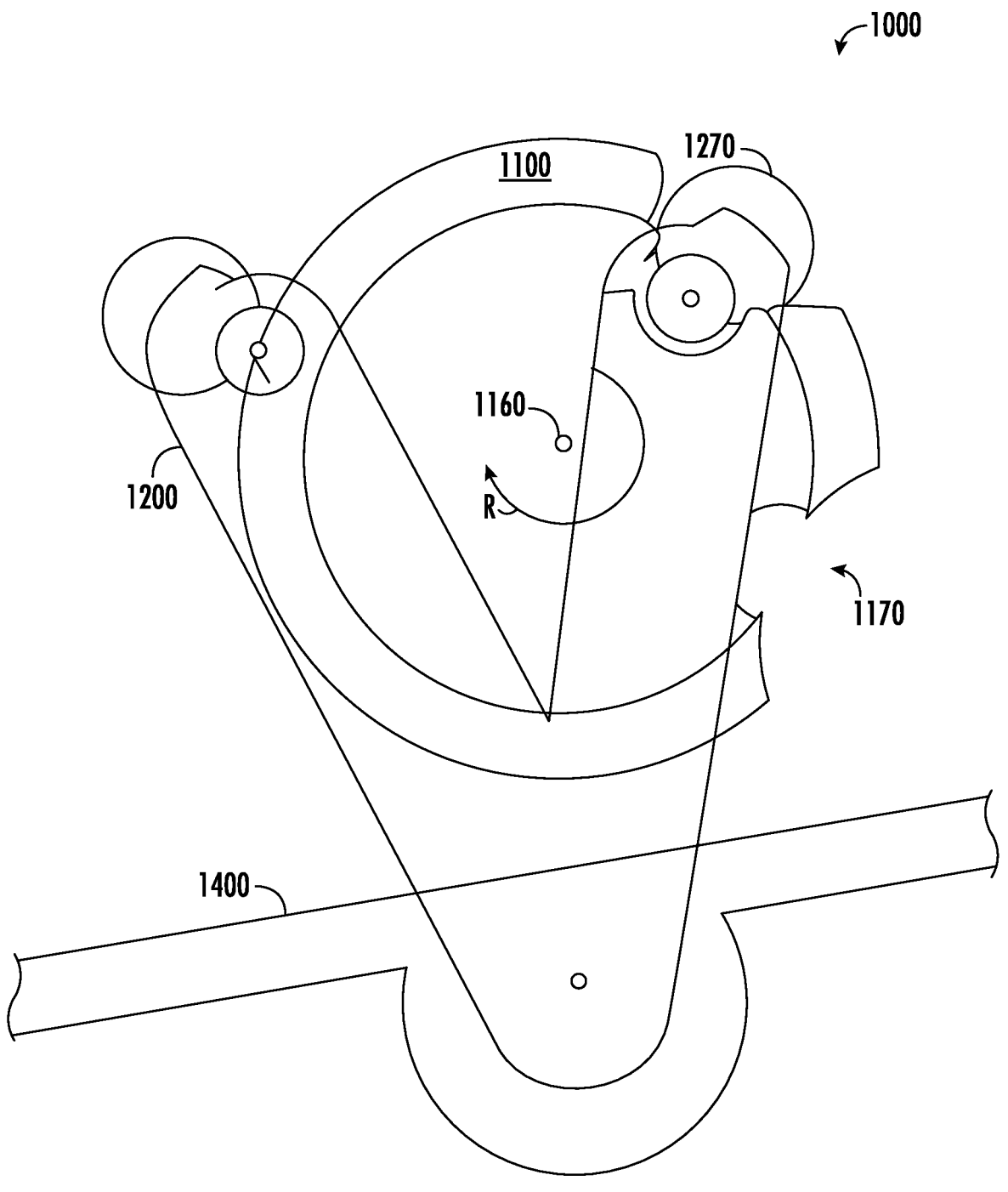
FIG. 12 shows aspects of another example embodiment of a rotary force transfer mechanism.

FIG. 12 shows aspects of a further example embodiment of a rotary force transfer mechanism, generally designated 1000, in which the gear 150 shown in the example embodiments shown in FIGS. 1-11 is replaced with a disk 1100 (e.g., a cylindrical structure) with cutouts that are formed in a perimeter of the disk 1100 to form negative engagement features, generally designated 1170, in the disk 1100. The negative engagement features 1100 can be referred to also as slots, pockets, or holes and are formed in the circumferential surface of the disk 1100. These negative engagement features 1170 allow for engagement of correspondingly-shaped positive engagement features 1270 during a downstroke motion of the input 1400 (e.g., pedal). Thus, FIG. 12 shows that the rack gear 250 and gear 150 of the example embodiments shown in FIGS. 1-11 can take simpler forms but retain the same functionality, namely, a positive engagement feature 1270 (e.g., analogous to the rack gear teeth 252) on a drive element (e.g., analogous to the rack gear 250) engaging within a negative engagement feature (e.g., analogous to the recesses or troughs formed between adjacent gear teeth 152) on a driven element (e.g., analogous to the gear 150), thereby causing the driven element, namely the disk 1100, to rotate upon receiving a force from the drive element 1200, through one of the positive engagement features 1270 being engaged within one of the negative engagement features 1170.

Thus, one side of the V-shaped drive element 1200 engages, via one of the positive engagement features 1270 provided at a distal end thereof, with the disk 1100 (e.g., in one of the negative engagement features 1170) during a downstroke motion. To cause this downstroke motion to occur, a rotational force is transferred to the disk 1100, upon receipt of an input for at the input 1400, through the drive element 1200. After the disk 1100 has rotated a prescribed distance, the positive engagement feature 1270 that caused the downstroke motion is disengaged from the negative engagement feature 1170 and the positive engagement feature 1270 at the other side of the V-shaped drive element 1200 engages with another negative engagement feature 1170 of the disk 1100, which causes the occurrence of an upstroke motion, in which the input 400 moves vertically to a position corresponding to a start of the downstroke motion. The downstroke motion and the upstroke motion together comprise the entire movement cycle of the rotary force transfer mechanism 1000. In some such embodiments, another disk 1100 and drive element are provided, connected to the components of the rotary force transfer mechanism 1000 shown (e.g., via the axle 1160), and synchronized such that the rotary movement of the mechanism is substantially continuous. According to this example embodiment, the drive force is provided tangentially to the disk 1100 only when it is most efficient (e.g., from an angle of about 45° to about 135°, as shown in the view of FIG. 12).

In some embodiments of the rotary force transfer mechanisms 100, 101, 102, 1000, a cable mechanism may be provided that connects between the left and right rack gears (e.g., for bipedal drive of the mechanism), such cable mechanism ensuring that one rack gear is engaging with its gear while the other rack gear is disengaging from its gear. In some such example embodiments, the upper end(s) of the rack gear(s) for each mechanism (e.g., in a bipedal system comprising at least two mechanisms) are attached to a cable, chain, or other suitably robust linkage element that intermittently alternates in rotation around a pulley mounted to the frame of the machine (e.g., bicycle, also referred to herein as a "system"), which allows the rack gears to engage with the corresponding gear during a downstroke motion and to disengage from the corresponding gear during an upstroke motion. Such a pulley can, for example, be "toothed" with a chain, a cable, a combination thereof, or any other suitable connection structure. The components can be adjusted in length and can have any time lapse between engagement and disengagement, if desired by the user, to provide a "dead zone" for freewheeling of the gear. The lower end(s) of the rack gear(s) for each mechanism (e.g., in a bipedal system comprising at least two mechanisms) are pivotally mounted to a corresponding one of the respective inputs (e.g., pedals) directly, equipped with a spring-loaded hinge (e.g., in the manner of a clutch), guided through a very short track, etc.

In some embodiments of the rotary force transfer mechanisms 100, 101, 102, 1000, a mechanism such as a toe-clip, toe-strap, or some other way of securing the foot or hand to the input may be provided so that the user may pull, during the upstroke motion, the input in an opposite direction from the downstroke motion.

In some embodiments, such rotary force transfer mechanisms 100, 101, 102, 1000, are operable using only a single pedal as input (e.g., not as bipedal mechanisms). In the example embodiments disclosed herein that engage another rack gear to perform the upstroke motion will advantageously be designed such that the gear either has enough momentum to accomplish the upstroke motion or, otherwise, has a second mechanism (e.g., including an input, one or more rack gears, and gear) for bipedal drive, such that power during the downstroke of one mechanism will be used at least partially for aiding in performing the upstroke motion of the opposing mechanism.

In some embodiments of the rotary force transfer mechanisms 100, 101, 102, 1000, a ratchet mechanism is provided for the gear (e.g., in/at the gear axle) to allow for a "freewheeling" motion of the gear when not being driven. The use of a rachet-type connection of the gear would allow the gear to freewheel other than during a power downstroke motion and would allow for idling of one or both inputs, which would provide a mechanism that does not require engagement and disengagement between the rack gear(s) and the gear. In some embodiments, this ratchet mechanism could be utilized at the drive wheel (e.g., as of a bicycle) to allow for retrofitting of the rotary force transfer mechanisms disclosed herein to conventionally known human-powered vehicles.

The rotary force transfer mechanisms 100, 101, 102, 1000 disclosed herein can be implemented in a plurality of application including, for example and without limitation, human-powered generators, pumps, vehicles (e.g., aircraft vehicles), and the like.

In some embodiments of the rotary force transfer mechanisms 100, 101, 102, 1000, the length of at least the downstroke and the upstroke may be variable (e.g., by altering dimensions of the guide and/or by selectively engaging the follower in one of a plurality of differently-dimensioned guides). As such, in a bicycle application, for example, since a cyclist may utilize a longer downstroke when accelerating than while maintaining a generally constant velocity, the length of the downstroke can be changed. Similarly, since different users will likely require different lengths for at least the downstroke due to physical characteristics (e.g., leg length) for optimal use, the use of a guide with variable downstroke length and/or a plurality of guides with different downstroke lengths can advantageously be implemented for the mechanisms disclosed herein.

This description is merely exemplary of the numerous and varied embodiments. The description or mentioning of one or more representative features of a given embodiment is likewise exemplary. Such an embodiment can typically exist with or without the feature(s) mentioned; likewise, those features can be applied to other embodiments of the presently disclosed subject matter, whether listed in this summary or not.

It will be understood that various details of the presently disclosed subject matter may be changed without departing from the scope of the presently disclosed subject matter. Furthermore, the foregoing description is for the purpose of illustration only and not for the purpose of limitation.

Unless defined otherwise, all technical and scientific terms used herein have the same meaning as commonly understood to one having ordinary skill in the art to which the presently disclosed subject matter belongs. Although, any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims. Thus, for example, reference to "a vial" can include a plurality of such vials, and so forth.

Unless otherwise indicated, all numbers expressing quantities of length, diameter, width, and so forth used in the specification and claims are to be understood as being modified in all instances by the terms "about" or "approximately". Accordingly, unless indicated to the contrary, the numerical parameters set forth in this specification and attached claims are approximations that can vary depending upon the desired properties sought to be obtained by the presently disclosed subject matter.

As used herein, the terms "about" and "approximately," when referring to a value or to a length, width, diameter, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate for the disclosed apparatuses and devices.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub-combinations of A, B, C, and D.

The invention claimed is:

1. A rotary force transfer mechanism comprising:
an input that comprises a pedal or a handle and is configured to receive a substantially linear input force;
a rotary structure that comprises a gear with a plurality of gear teeth formed about an outer circumferential surface of the gear;
a drive element that comprises a rack gear and is configured for selective coupling with the rotary structure to transmit the input force to the rotary structure to cause a corresponding rotary motion of the rotary structure; and
a guide attached to a rigid frame, the drive element comprising a follower that is engaged within the guide and is configured to move along a path defined by the guide;
wherein the drive element engages, when transmitting the input force to the rotary structure, with the outer circumferential surface of the rotary structure gear, such that the input force is transmitted to the rotary structure in a direction tangential to a position where the drive element is coupled to the rotary structure;
wherein the rack gear comprises a plurality of rack gear teeth that are formed along a length of the rack gear;
wherein the plurality of rack gear teeth are configured to engage with the plurality of gear teeth of the gear for transmitting the input force to the gear;
wherein, at a rear of the pedal or the handle, the pedal or the handle is attached to a static pivot bearing rigidly attached to the frame; and
wherein, at a front of the pedal or the handle, the pedal or the handle is attached to a mobile pivot bearing that is configured such that the rack gear is pivotable relative to the pedal or the handle.

2. The rotary force transfer mechanism of claim 1, wherein the path of the guide is continuous and uninterrupted.

3. The rotary force transfer mechanism of claim 1, wherein, as the follower moves along the path defined by the guide, the drive element moves between an engagement position, in which the drive element is coupled to the rotary structure, and a disengagement position, in which the drive element is decoupled from the rotary structure, in an alternating manner.

4. The rotary force transfer mechanism of claim 1, wherein the guide comprises a plurality of parts of the path, each part of the path corresponding to a motion of the rack gear relative to the gear.

5. A system comprising a plurality of the rotary force transfer mechanisms of claim 1, wherein:
the plurality of the rotary force transfer mechanisms comprises a first rotary force transfer mechanism and a second rotary force transfer mechanism; and
the gear of the first rotary force transfer mechanism is attached to the gear of the second rotary force transfer mechanism.

6. The system of claim 5, wherein the gears of the first and second rotary force transfer mechanisms are rigidly fixed to each other, so as to co-rotate with each other and to prevent relative angular movement therebetween.

7. The system according to claim 6, wherein the system is a human-powered vehicle.

8. The system according to claim 7, wherein the human-powered vehicle is a bicycle.

9. The rotary force transfer mechanism according to claim 3, wherein:

the rack gear is a downstroke rack gear; and the drive element further comprises an upstroke rack gear that comprises a plurality of rack gear teeth formed along a length of the upstroke rack gear, the plurality of rack gear teeth of the upstroke rack gear being configured to engage with the plurality of gear teeth of the gear.

10. The rotary force transfer mechanism according to claim 9, wherein the downstroke rack gear and the upstroke rack gear are provided on opposite sides of the gear from each other in a radial direction of the gear, the downstroke rack gear comprising the follower.

11. The rotary force transfer mechanism according to claim 10, wherein, between the mobile pivot bearing and the static pivot bearing, the pedal or the handle is attached to the upstroke rack gear at a second mobile pivot bearing, such that the upstroke rack gear is pivotable relative to the pedal or the handle.

12. A rotary force transfer mechanism comprising:

an input that comprises a pedal or a handle and is configured to receive a substantially linear input force;

a rotary structure that comprises a gear with a plurality of gear teeth formed about an outer circumferential surface of the gear;

a drive element that comprises a rack gear and is configured for selective coupling with the rotary structure to transmit the input force to the rotary structure to cause a corresponding rotary motion of the rotary structure; and a guide attached to a rigid frame, the drive element comprising a follower that is engaged within the guide and is configured to move along a path defined by the guide;

wherein the drive element engages, when transmitting the input force to the rotary structure, with the outer circumferential surface of the gear, such that the input force is transmitted to the rotary structure in a direction tangential to a position where the drive element is coupled to the rotary structure;

wherein the rack gear comprises a plurality of rack gear teeth that are formed along a length of the rack gear;

wherein the plurality of rack gear teeth are configured to engage with the plurality of gear teeth of the gear for transmitting the input force to the gear;

wherein the guide comprises a plurality of parts of the path, each part of the path corresponding to a motion of the rack gear relative to the gear.

13. The rotary force transfer mechanism of claim 12, wherein:

the path defined by the guide comprises first, second, third, and fourth parts;

movement of the follower of the rack gear along the first part of the path comprises a downstroke motion of the rack gear, relative to the gear;

movement of the follower of the rack gear along the second part of the path comprises a disengagement motion of the rack gear, relative to the gear, in which the rack gear moves radially away from the gear for the rack gear teeth to disengage from the gear teeth;

movement of the follower of the rack gear along the third part of the path comprises an upstroke motion of the rack gear, relative to the gear, the rack gear teeth being disengaged from the gear teeth of the gear during an entirety of the upstroke motion, wherein the upstroke motion is in a substantially opposite direction from the downstroke motion; and movement of the follower of the rack gear along the fourth part of the path comprises a reengagement motion of the rack gear, relative to the gear, in which the rack gear moves radially towards the gear for the rack gear teeth to engage with the gear teeth.

14. The rotary force transfer mechanism of claim 13, wherein the follower is configured to move sequentially through the first, second, third, and fourth parts of the path defined by the guide repeatedly.

15. The rotary force transfer mechanism of claim 13, comprising a return mechanism configured to cause movement of the follower sequentially along the third and fourth parts of the path defined by the guide automatically when the follower completes movement entirely through the second part of the path.

16. The rotary force transfer mechanism according to claim 15, wherein the return mechanism comprises a spring connected between the frame and the rack gear.

17. A rotary force transfer mechanism comprising:

an input that comprises a pedal or a handle and is configured to receive a substantially linear input force;

a rotary structure that comprises a gear with a plurality of gear teeth formed about an outer circumferential surface of the gear;

a drive element that comprises a downstroke rack gear and an upstroke rack gear, wherein the drive element is configured for selective coupling with the rotary structure to transmit the input force to the rotary structure to cause a corresponding rotary motion of the rotary structure; and a guide attached to a rigid frame, the drive element comprising a follower that is engaged within the guide and is configured to move along a path defined by the guide;

wherein the drive element engages, when transmitting the input force to the rotary structure, with the outer circumferential surface of the gear, such that the input force is transmitted to the rotary structure in a direction tangential to a position where the drive element is coupled to the rotary structure;

wherein, as the follower moves along the path defined by the guide, the drive element moves between an engagement position, in which the drive element is coupled to the rotary structure, and a disengagement position, in which the drive element is decoupled from the rotary structure, in an alternating manner;

wherein the downstroke rack gear comprises a plurality of rack gear teeth formed along a length of the upstroke rack gear;

wherein the rack gear comprises a plurality of rack gear teeth formed along a length of the upstroke rack gear;

wherein the plurality of rack gear teeth of the downstroke and upstroke rack gears are configured to engage with the plurality of gear teeth of the gear;

wherein the downstroke rack gear and the upstroke rack gear are on opposite sides of the gear from each other in a radial direction of the gear, the downstroke rack gear comprising the follower;

wherein, at a rear of the pedal or the handle, the pedal or the handle is attached to a static pivot bearing rigidly attached to the frame;

wherein, at a front of the pedal or the handle, the pedal or the handle is attached to a mobile pivot bearing that is configured such that the rack gear is pivotable relative to the pedal or the handle; and wherein, between the mobile pivot bearing and the static pivot bearing, the pedal or the handle is attached to the upstroke rack gear at a second mobile pivot bearing, such that the upstroke rack gear is pivotable relative to the pedal or the handle.

18. The rotary force transfer mechanism according to claim 17, comprising a linkage rod that is pivotably attached, at a first, distal end, to the upstroke rack gear and, at a second, proximal end, to the downstroke rack gear.

19. The rotary force transfer mechanism according to claim 18, wherein:

the path defined by the guide comprises first, second, third, and fourth parts;

movement of the follower of the downstroke rack gear along the first part of the path comprises, relative to the gear, a downstroke motion of the downstroke rack gear and a downstroke-like motion of the upstroke rack gear, the downstroke rack gear being engaged with the gear during an entirety of the downstroke motion and the upstroke rack gear being disengaged from the gear during an entirety of the downstroke-like motion;

movement of the follower of the downstroke rack gear along the second part of the path comprises:

a disengagement motion of the downstroke rack gear, relative to the gear, in which the downstroke rack gear moves radially away from the gear, such that the rack gear teeth of the downstroke rack gear disengage from the gear teeth; and simultaneously, a reengagement motion of the upstroke rack gear, relative to the gear, in which the upstroke rack gear moves radially towards the gear, such that the rack gear teeth of the upstroke rack gear engage with the gear teeth;

movement of the follower of the downstroke rack gear along the third part of the path comprises, relative to the gear, an upstroke motion of the downstroke rack gear and an upstroke-like motion of the upstroke rack gear, the rack gear teeth of the downstroke rack gear being disengaged from the gear teeth during an entirety of the upstroke motion and the rack gear teeth of the upstroke rack gear being engaged with the gear teeth during an entirety of the upstroke motion, the upstroke motion being in a substantially opposite direction from the downstroke motion; and movement of the follower of the downstroke rack gear along the fourth part of the path comprises:

a reengagement motion of the downstroke rack gear, relative to the gear, in which the downstroke rack gear moves radially towards the gear, such that the rack gear teeth of the downstroke rack gear engage with the gear teeth; and simultaneously, a disengagement motion of the upstroke rack gear, relative to the gear, in which the upstroke rack gear moves radially away from the gear, such that the rack gear teeth of the upstroke rack gear disengage from the gear teeth.

20. The rotary force transfer mechanism according to claim 19, wherein the downstroke and upstroke rack gears are pivotably attached to each other by the linkage rod so that the downstroke and upstroke rack gears move simultaneously with each other.

21. The rotary force transfer mechanism according to claim 20, wherein the follower is configured to move sequentially through the first, second, third, and fourth parts of the path defined by the guide in a repeatable manner.

* * * * *